(12) United States Patent
Keltcher et al.

(10) Patent No.: US 6,314,494 B1
(45) Date of Patent: Nov. 6, 2001

(54) DYNAMICALLY SIZE CONFIGURABLE DATA BUFFER FOR DATA CACHE AND PREFETCH CACHE MEMORY

(75) Inventors: Paul Keltcher, Cupertino, CA (US); Jeanne M Hermsen, Corvallis, OR (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/292,273

(22) Filed: Apr. 15, 1999

(51) Int. Cl.[7] ................................................ G06F 12/08
(52) U.S. Cl. ..................... 711/137; 711/119; 711/129; 711/137; 712/207; 712/224
(58) Field of Search ........................ 711/119, 120, 711/129, 137, 122, 117, 127; 712/224, 207

(56) References Cited

U.S. PATENT DOCUMENTS

| | | | |
|---|---|---|---|
| 5,293,609 | * 3/1994 | Shih et al. | 711/137 |
| 5,566,324 | * 10/1996 | Kass | 711/160 |
| 5,586,295 | 12/1996 | Tran | 395/464 |
| 5,680,564 | 10/1997 | Divivier et al. | 395/381 |
| 5,737,750 | * 4/1998 | Kumar et al. | 711/129 |
| 6,134,633 | * 10/2000 | Jacobs | 711/137 |

\* cited by examiner

*Primary Examiner*—Do Hyun Yoo
*Assistant Examiner*—Jasmine Song

(57) ABSTRACT

A size configurable data buffer includes a plurality of data cache memory registers and a variable number of prefetch memory registers. A computer controller determines the allocation of the data buffer which is data cache memory registers or prefetch memory registers. The size configurable data buffer may be included within a single size configurable data buffer SRAM circuit.

5 Claims, 3 Drawing Sheets

DYNAMICALLY SIZE CONFIGURABLE DATA BUFFER FOR DATA CACHE AND PREFETCH CACHE MEMORY

FIELD OF THE INVENTION

This invention relates generally to computer memory. More particularly, this invention relates to a sizeable data buffer that includes data cache memory and prefetch cache memory.

BACKGROUND

Most modern computer systems include a controller and a main memory. The speed at which the controller can decode and execute instructions to process data has for some time exceeded the speed at which instructions and data can be transferred from main memory to the controller. In an attempt to reduce the problems cause by this mismatch, most computer systems include a cache memory between the controller and main memory.

The cache memory is used in computer systems to effectively accelerate the execution speed of instructions and commands by the computer controller. Cache memory is relatively small memory compared to the main memory. The cache memory, however, provides much faster access time than the access time associated with the main memory. The cache memory provides quick access to instructions and data that are most frequently used by the controller.

Instructions and data received from the main memory by the controller for execution are also stored in the high speed cache memory. Therefore, the controller has ready access to the most recently executed instructions and data if the same instructions or data be needed again by the controller. When the controller requires an instruction and data a second time, rather than initiating a relatively slow main memory retrieval, the controller quickly retrieves the information from the high speed cache memory.

It is important to keep track of which lines of code and data are stored in the cache memory. One technique is to use TAG cache memory which includes memory locations for storing TAG addresses that correspond to addresses of the particular information stored in the cache memory. The controller generates a request for an instruction of data in the form of an address. Retrievals from main memory are made using the entire memory address. The cache memory is smaller than the main memory. Therefore, only a subset of the entire memory address is required for retrievals from the cache memory. The portion of the entire memory address that is not included within the subset required for retrievals from the cache memory is stored within the corresponding location of the TAG cache memory. The TAG addresses are used to determine when an address generated by the controller is one in which the cache memory contains the requested information. To accomplish this, the address generated by the controller is compared to the TAG addresses. When the address generated by a request from the controller matches a TAG address, then the cache memory contains the requested information, and a TAG hit occurs. If an address generated by the controller fails to match any TAG address, then a TAG miss occurs. When a TAG miss occurs, e.g. the requested information is not contained in the cache memory, a memory cycle to the main memory must be generated to obtain the requested information. A memory cycle to the main memory requires much more time than a memory cycle to the cache memory.

Many computer systems also include prefetch cache memory in which prefetch information, e.g. information that the controller does not immediately need, is stored. Prefetch information is requested and retrieved from main memory and stored in the prefetch memory because a high probability exists that the controller will request the information in the near future. The stored prefetch information is available to the controller in prefetch cache memory. Therefore, the controller does not need to retrieve this information from the main memory in the future.

Cache memory and prefetch cache memory in present computer systems exist in separate RAM (random access memory). It is generally believed that by physically separating the two types of cache, the performance of the computer system is enhanced. However, the requirement of separate RAM for each of the types of cache requires at least two separate RAM integrated circuits, which increases the cost of the computer system.

It is desirable to have a computer system in which cache memory and prefetch cache memory can be located within a single RAM, and therefore be less expensive. Additionally, it is desirable that the size of the prefetch cache memory be variably adjusted by a controller within the computer system to allow the controller to optimize the prefetch cache size depending upon the task being performed by the controller.

SUMMARY OF THE INVENTION

The present invention is a computer memory system in which cache memory and prefetch cache can be located within a single RAM integrated circuit. The size of the prefetch cache can be adjusted by a computer system controller.

A first embodiment of this invention includes a size configurable data buffer. The size configurable data buffer includes a plurality of data cache memory registers and a variable number of prefetch memory registers. This embodiment also includes control circuitry that allows for adjusting the number of prefetch memory registers responsive to a controller.

A second embodiment of the invention is similar to the first embodiment. The second embodiment includes a single size configurable data buffer SRAM circuit that includes the data cache memory registers and the prefetch memory registers.

A third embodiment of the invention is similar to the first embodiment. The control circuitry which allows for adjusting the number of prefetch memory registers of the third embodiment includes mask circuitry for masking line address bits when storing information in prefetch memory.

A fourth embodiment of the invention is similar to the third embodiment. The fourth embodiment further includes an address recovery SRAM for storing the masked line address bits.

A fifth embodiment of the invention is similar to the fourth embodiment. The fifth embodiment further includes a TAG SRAM for storing non-masked line address bits.

A sixth embodiment of the invention is similar to the fifth embodiment. The sixth embodiment further includes a TAG compare circuit for comparing requested line address bits with line address bits stored in the address recovery SRAM and the TAG SRAM.

Other aspects and advantages of the present invention will become apparent from the following detailed description, taken in conjunction with the accompanying drawings, illustrating by way of example the principles of the invention.

DETAILED DESCRIPTION

Figure 1:
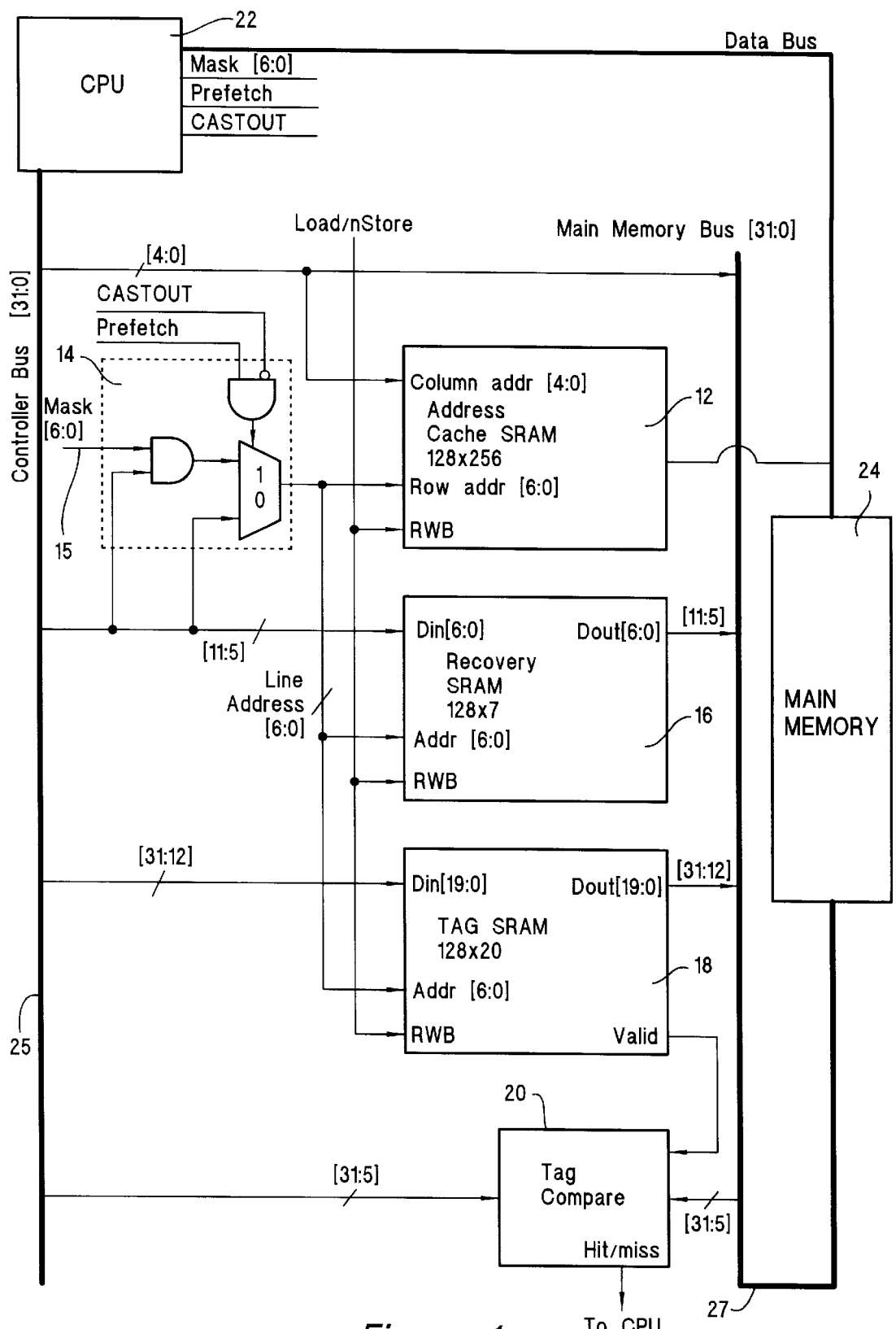
FIG. 1 shows an embodiment of the invention.

As shown in the drawings for purposes of illustration, the invention is embodied in a size configurable data buffer. The size configurable data buffer includes two caches: data and prefetch. The size of the prefetch cache is adjustable. The size configurable data buffer can be implemented with a single SRAM (Static Random Access Memory) circuit.

FIG. 1 shows an embodiment of the invention. This embodiment includes a size configurable data buffer 12. The size configurable data buffer 12 includes data cache and prefetch cache. Mask circuitry 14 determines the allocation between data cache and prefetch cache within the size configurable data buffer 12. The embodiment of FIG. 1 shows the data cache and prefetch cache within a single SRAM circuit, the size configurable data buffer 12. However, the data cache and prefetch cache can be divided into multiple SRAM circuits. A single SRAM circuit or integrated circuit is generally less expensive than two circuits or integrated circuits.

The embodiment shown in FIG. 1 also includes an address recovery SRAM 16, a TAG SRAM 18, a TAG comparator 20, a controller (CPU) 22, a controller address bus (Controller Bus [31:0] 25), a main memory address bus (Main Memory BUS [31:0] 27) and a main memory 24.

Data retrieved from the main memory 24 by the controller 22 for execution can be stored in data cache. Therefore, when the same data is requested again by the controller 22, the controller 22 has ready access to the most recently executed data . If the controller 22 requires data a second time, rather than initiating a relatively slow main memory retrieval, the controller 22 quickly retrieves the data from the data cache memory.

Prefetch information, e.g. information that the controller 22 does not immediately need, is requested and retrieved from main memory 24 and stored in the prefetch cache because a high probability exists that the controller 22 will request the information in the near future. The stored prefetch information is available to the controller 22 in prefetch cache memory. Therefore, the controller 22 does not need to retrieve this information from the main memory 24 in the future.

Figure 2:
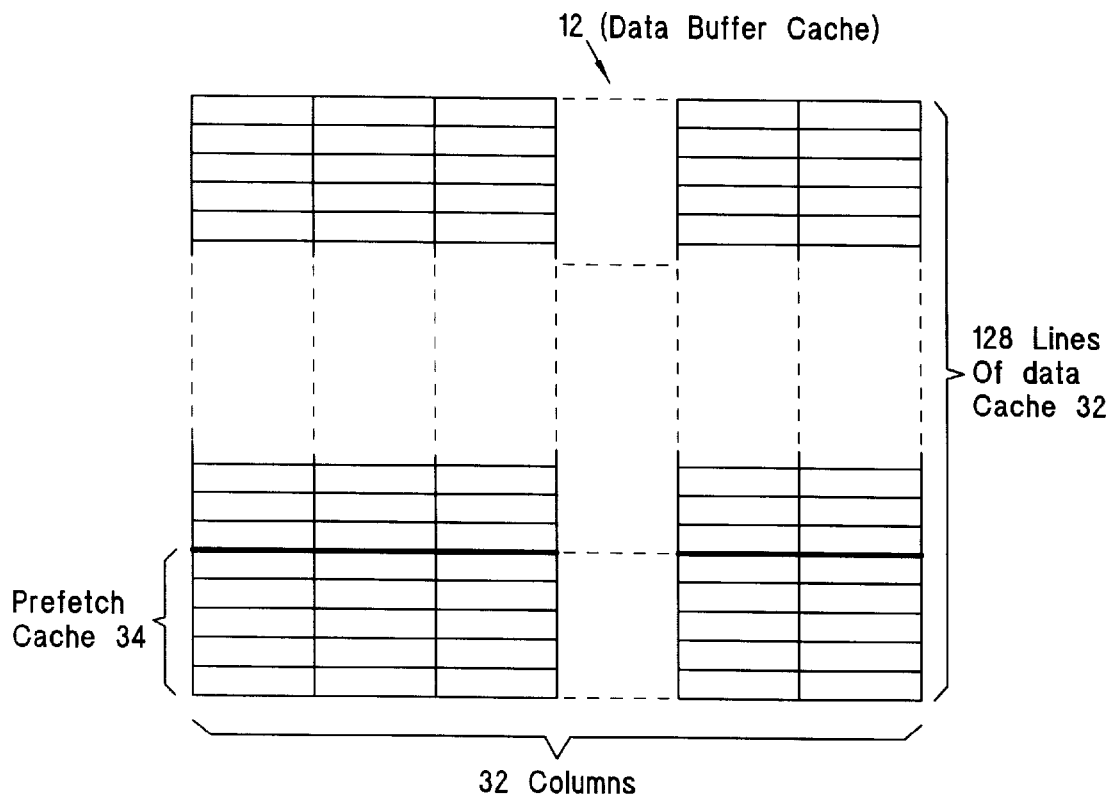
FIG. 2 shows a memory allocation representation of the data buffer cache.

FIG. 2 shows a memory allocation representation of the size configurable data buffer 12 which includes data cache 32 and prefetch cache 34. For this embodiment, the size configurable data buffer 12 includes 128 lines of information. Each line is divided into 32 columns of 8 bits of data. Therefore, the size configurable data buffer 12 of this embodiment is 256 bits wide.

Since the size configurable data buffer 12 of the embodiment of the invention described here includes 128 lines and 32 columns, the configurable data buffer 12 can include an desired number of lines and columns. The size of the support circuitry (the mask circuitry 14, the address recovery SRAM 16, the TAG SRAM 18) will vary accordingly. The number of address line includes within the Controller BUS 25 and the main Main Memory BUS 27 can also vary.

Since the size configurable data buffer 12 includes data cache 32 and prefetch cache 34. Therefore, adjustment of the size of the prefetch cache 34 will affect the size of the data cache 32.

The portions of the size configurable data buffer 12 allocated between data cache 32 and prefetch cache 34 is determined by the mask circuitry 14. The allocation between data cache 32 and prefetch cache 34 is variable. Mask lines 15, as shown in FIG. 1, that are received by the mask circuitry 14, determine the size configurable data buffer 12 allocation. Since controller 22 controls the mask lines 15. the controller 22 can vary the size configurable data buffer 12 allocation in real time. This allows optimization of the size configurable data buffer 12 allocation for a particular task being performed by the controller 22. Great controller 22 processing advantages can be obtained through the use of the variable configurable data buffer 12 allocation. The controller adapts the allocation between data cache and prefetch cache within the variable configurable data buffer 12 to optimize the controller 22 processing of the particular task.

Figure 3:
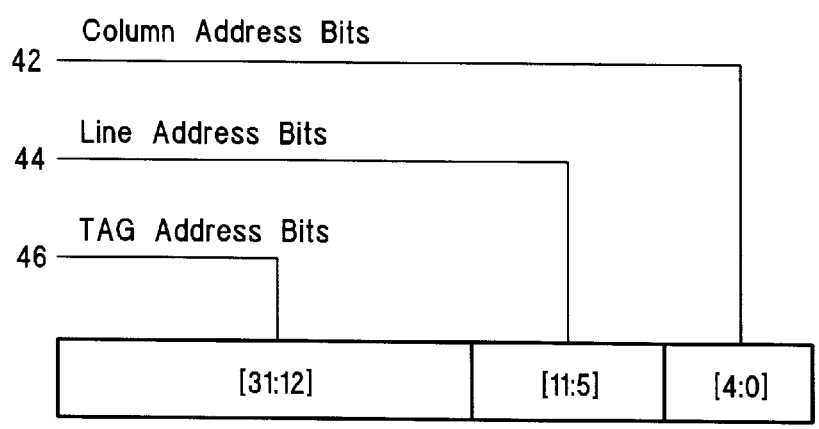
FIG. 3 shows the address bits of the controller address bus of FIG. 1, including column address bits, line address bits and TAG address bits.

FIG. 3 shows the address bits of the Controller BUS 25 of FIG. 1. The address bits of the controller address bus 25 include column address bits 42, line address bits 44 and TAG address bits 46. This embodiment includes five column address bits (bits 4:0), seven line address bits (bits 11:5), and twenty TAG address bits (bits 31:12). Five column address bits are required because this embodiment of the size configurable data buffer 12 includes 32 columns. Seven line address bits are required because this embodiment of the size configurable data buffer 12 includes 128 lines (rows) of memory. Twenty TAG address bits are required because in this embodiment the address bus 25 of the main memory 24 is thirty two bits wide.

The address bit assignments are not restricted to the assignments shown in FIG. 3. This assignment is particular to this embodiment.

The mask circuitry 14 modifies the line address bits (Controller BUS [11:5]) of the Controller BUS 25 under certain conditions. The mask circuitry 14 generates Line Address [6:0] that correspond to the seven Controller BUS [11:5] bits or the modified line address bits. The mask circuitry 14 receives a Prefetch input and a CASTOUT input. When the Prefetch input is active (high) and the CASTOUT input is inactive (low), the mask circuitry 14 modifies the line address bits by "anding" the line address bits with the mask lines 15. The controller 22 controls the Prefetch input, the CASTOUT input and the mask lines 15.

Figure 4:
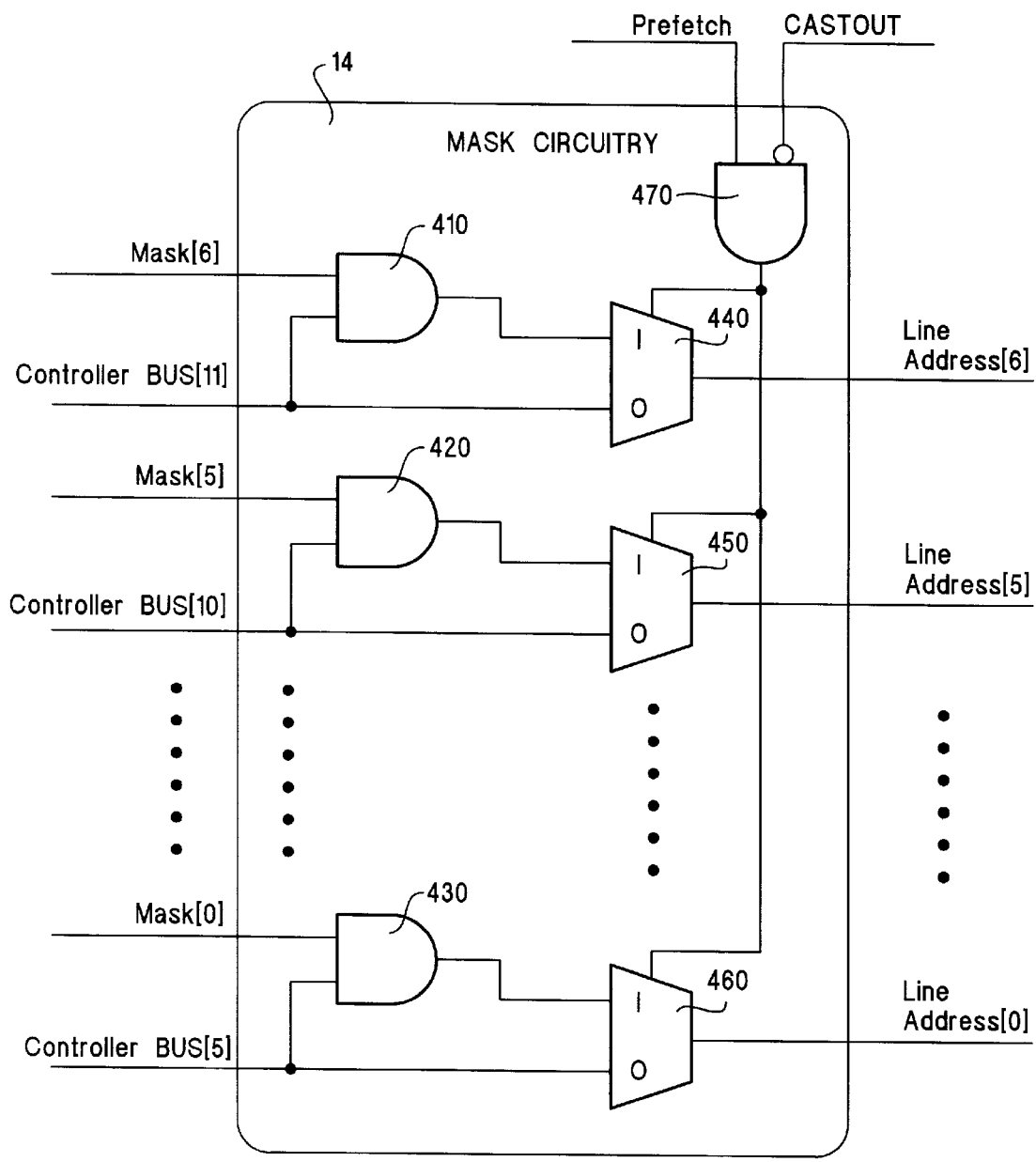

FIG. 4 shows greater detail of the mask circuitry 14. As shown in FIG. 1, this embodiment of the invention includes the mask circuitry 14 receiving seven mask bits Mask [6:0], seven controller bus bits Controller BUS [11:5], the Pretech input, the CASTOUT input, and generating seven Line Address [6:0] bits. As shown in FIG. 4, a first AND gate 410 receives the Mask[6] bit and the Controller BUS [11] bit. A first multiplexor 440 receives an output of the first AND gate 410 and the Controller BUS 9110 bit. The first muliplexer 440 generates the Line Address [6] bit. A second AND gate 420 receives the Mask[5] bit and the Controller BUS [10] bit. A second multiplexer 340 receives an output of the second AND gate 420 and the Controller BUS [10] bit. The second multiplexer 450 generates the Line Address [5] bit. A third AND gate 430 receives the Mask[0] bit and the Controller BUS[5] bit. A third multiplexer 460 receives an output of the third AND gate 430 and the Controller BUS[5] bit. The third multiplexer 460 generates the Line Address [0] bit. The Mask [4:1] bits and Controller BUS [9:6] bits are similarly received by corresponding mask circuitry 14 AND gates and multiplexers.

A fourth AND gate 470 receives the Prefetch input and the CASTOUT inputs. An output of the fourth AND gate 470 controls the first multiplexer 440, the second multiplexer 450, and the third multiplexer 460. As previously described, when the Prefetch input is active (high) and the CASTOUT input is inactive (low), the mask circuitry 14 modifies the line address bits by "anding" the line address bits of the Controller BUS 25 with the mask lines 15.

When data is processed by the controller within the size configurable data buffer 12, the line address bits of the data are stored at the line address within the address recovery SRAM 16 when the data is being accessed from the data cache. The line address bits of the data are stored at the modified line address within the address recovery SRAM 16 when the data is being accessed from the prefetch cache.

When data is accessed by the controller within the size configurable data buffer 12, the TAG address bits of data are stored at the line address within the address recovery SRAM 16 if the data being accessed is from the data cache. The modified line address of the data are stored at the line address within the address recovery SRAM 16 when the data is being accessed from the prefetch cache.

The TAG comparator 20 compares address bits of the controller address bus 25 (line address and TAG address bits) of data requested by the controller 22 with the address bits of the main memory address bus 27 (line address and TAG address bits) stored in the corresponding address recovery SRAM 16 and TAG SRAM 18 line address or modified line address locations. When f the requested address bits and the stored address bits are identical, a TAG hit occurs that indicates to the controller 20 that the requested data is stored in the data cache or the prefetch cache of the size configurable data buffer 12. The controller can subsequently utilize the data from the size configurable data buffer 12 that was accessed at the same time as the TAG access. If a TAG miss occurs, the controller must access the requested data from the main memory 24.

When the controller 22 specifies the requested data as prefetch data, the PREFETCH input is activated (set true) by the controller. Otherwise, the PREFETCH input is not activated (set false). As previously stated, when the PREFETCH input is true and the CASTOUT input is false, the line address bits are modified by the mask circuitry 15.

There are generally three major modes of operation. The three modes include a castout mode, a load mode and a store mode.

The castout mode occurs when transferring data from the size configurable data buffer 12 (data cache or prefetch cache) to main memory 24. In the castout mode, the CASTOUT input is activated (set true) by the controller 22. Therefore, the mask circuitry 14 cannot modify the line address bits. The controller 22 accesses the data within the size configurable data buffer 12. The address bits of the main memory address bus 27 are constructed from the columns bits of the controller address bus 25, and the data output of the address recovery SRAM 16 and the data output of the TAG SRAM 18. A load/store control line from the controller 22 drives read/write (RWB) inputs to the size configurable data buffer 12, the address recovery SRAM 16 and the TAG SRAM 18 to a read mode. The data transfer from the size configurable data buffer 12 to main memory 24 is then completed.

The load mode occurs when the controller 22 is reading data from the size configurable data buffer 12 (data cache or prefetch cache). In the load mode the CASTOUT input is deactivated (set false). The PREFETCH input is activated (set true) when the controller specifies the data as prefetch data. The controller 22 generates the address bits of the controller address bus 25 to access the desired data. When the address bits of the desired data match the line address bits stored within the address recovery SRAM 16 and the TAG address bits stored within the TAG SRAM 18, a TAG hit occurs and the controller 22 reads the desired data from the size configurable data buffer 12. If a TAG miss occurs, then the controller 22 reads the data from main memory 24.

The store mode occurs when the controller 22 is writing new data to the size configurable data buffer 12 (data cache or prefetch cache). Initially, the CASTOUT input is deactivated (set false). The PREFETCH input is activated (set true) if the controller 22 recognizes the data as prefetch data. The controller 22 generates the address bits of the controller address bus 25 that correspond to the address of the location the data is to be written. When the address bits of the location match the line address bits stored within the address recovery SRAM 16 and the TAG address bits stored within the TAG SRAM 18, a TAG hit occurs and the controller 22 writes the data to the size configurable data buffer 12. When a TAG miss occurs and the data located in the size configurable data buffer 12 at the location the new data is to be written has previously been modified, then the controller 22 activates the CASTOUT input and transfers that data to the main memory 24. The controller then deactivates the CASTOUT line and writes the new data to the size configurable data buffer 12. Again, the PREFETCH input is activated when the controller 22 recognizes the data as prefetch data. The line address bits and the TAG address bits of the new data are stored in the address recovery SRAM 16 and the TAG SRAM 18 for future reference.

Although specific embodiments of the invention have been described and illustrated, the invention is not to be limited to the specific forms or arrangements of parts so described and illustrated. The invention is limited only by the claims.

What is claimed is:

1. A size configurable data buffer comprising:
   a controller bus, having address bits corresponding to mask, column, line, and TAG, generating a prefetch signal having a first and a second state;
   a SRAM circuit including,
      data cache memory registers,
      prefetch memory registers; and
      masking circuitry, connected to the controller bus and SRAM circuit, outputting modified line address bits, including,
         a plurality of two-input AND gates, each AND gate receiving a line and a mask address bit, and
         a plurality of 2:1 multiplexers, receive a prefetch control line, each multiplexer receiving an output from the AND gates and the corresponding line address bit, outputting the modified line address bits when the prefetch signal is in the first state, and unmodified line address bits when the prefetch signal is in the second state.

2. A size configurable data buffer, as defined in claim 1, wherein when the prefetch signal is in the first state, the masking circuitry stores information in the prefetch memory registers.

3. A size configurable data buffer, as defined in claim 2, further comprising an address recovery SRAM, connected to the masking circuitry, storing the modified line address bits.

4. A size configurable data buffer, as defined in claim 3, further comprising a TAG SRAM, connected to the masking circuitry, storing the unmodified line address bits.

5. A size configurable data buffer, as defined in claim 4, further comprising a TAG compare circuit comparing requested line address bits with masked and non-masked line address bits.

* * * * *